United States Patent
Gledhill et al.

(10) Patent No.: US 12,515,993 B2
(45) Date of Patent: Jan. 6, 2026

(54) CEMENTED TUNGSTEN CARBIDE BODY AND METHOD OF FORMING THE CEMENTED TUNGSTEN CARBIDE BODY

(71) Applicants: DIAMOND INNOVATIONS, INC., Worthington, OH (US); HYPERION MATERIALS & TECHNOLOGIES, INC., Worthington, OH (US)

(72) Inventors: Andrew Gledhill, Westerville, OH (US); Venkata Durga Prasad Kappagantula, Lewis Center, OH (US); Olivier Ther, Sant Fost de Campsentelles (ES)

(73) Assignee: Diamond Innovations, Inc., Worthington, OH (US)

( * ) Notice: Subject to any disclaimer, the term of this patent is extended or adjusted under 35 U.S.C. 154(b) by 524 days.

(21) Appl. No.: 18/042,818

(22) PCT Filed: Nov. 4, 2021

(86) PCT No.: PCT/US2021/058013
§ 371 (c)(1),
(2) Date: Feb. 24, 2023

(87) PCT Pub. No.: WO2022/098842
PCT Pub. Date: May 12, 2022

(65) Prior Publication Data
US 2023/0348333 A1 Nov. 2, 2023

Related U.S. Application Data

(60) Provisional application No. 63/110,213, filed on Nov. 5, 2020.

(51) Int. Cl.
*C04B 35/56* (2006.01)
*C04B 41/00* (2006.01)
(Continued)

(52) U.S. Cl.
CPC ...... *C04B 35/5626* (2013.01); *C04B 41/0018* (2013.01); *C04B 41/0072* (2013.01);
(Continued)

(58) Field of Classification Search
None
See application file for complete search history.

(56) References Cited

U.S. PATENT DOCUMENTS 3,647,576 A * 3/1972 Yamamura ............ C23C 30/005
205/741
5,116,416 A 5/1992 Knox
(Continued)

FOREIGN PATENT DOCUMENTS

JP H05171335 A * 7/1993
JP 2002249843 A 9/2002

*Primary Examiner* — Seth Dumbris
(74) *Attorney, Agent, or Firm* — Ari G. Zytcer

(57) ABSTRACT

A cemented tungsten carbide body is formed by mixing a tungsten carbide powder and a cobalt powder together to form a powder mixture. The tungsten carbide powder makes up greater than or equal to 80 weight percent of the powder mixture, while the cobalt binder powder makes up about 1.5 weight percent to about 20 weight percent of the powder mixture. Next, the powder mixture is compacted to form a green compact, and a boron nitride coating is applied to a surface of the green compact to form a coated compact. The coated compact is sintered at a temperature sufficient to melt the cobalt powder, such that boron from the boron nitride coating diffuses into the compact and creates a gradient of metallic cobalt and boron extending inward from the surface. The metallic cobalt content increases from the surface inward, while the boron content decreases from the surface inward.

17 Claims, 2 Drawing Sheets

(51) Int. Cl.
*C04B 41/50* (2006.01)
*C04B 41/51* (2006.01)

(52) U.S. Cl.
CPC ...... *C04B 41/5064* (2013.01); *C04B 41/5144* (2013.01); *C04B 2235/3847* (2013.01); *C04B 2235/386* (2013.01); *C04B 2235/405* (2013.01); *C04B 2235/75* (2013.01)

(56) References Cited

U.S. PATENT DOCUMENTS

| | | |
|---|---|---|
| 8,602,131 B2 | 12/2013 | Colin et al. |
| 2007/0110607 A1* | 5/2007 | Iwasaki .................. C22C 29/08 419/15 |
| 2014/0087210 A1* | 3/2014 | Keane ...................... B22F 1/18 428/548 |

* cited by examiner

CEMENTED TUNGSTEN CARBIDE BODY AND METHOD OF FORMING THE CEMENTED TUNGSTEN CARBIDE BODY

This is a National Phase Application filed under 35 U.S.C. 371 as the national stage of PCT/US2021/058013 filed on Nov. 4, 2021, an application claiming the benefit of U.S. Application No. 63/110,213 filed on Nov. 5, 2020, the entire content of each of which is hereby incorporated by reference in its entirety.

BACKGROUND

The present subject matter pertains to cemented tungsten carbide metal matrix composite and, more particularly, to treatment of cemented tungsten carbide with boron nitride.

Certain products, such as valve seats, are frequently made from steel due to steel's inherent toughness. However, steel components erode very quickly in certain applications. Cemented tungsten carbide components have much better erosion resistance but do not have the required toughness for some designs. While some cemented tungsten carbide components have been subject to a surface treatment after sintering, the depth of the treated area has been relatively shallow. It would be desirable to be able to provide products that have both high toughness and high erosion resistance. It would also be desirable to provide products that have a surface treatment that extends deeper within the products.

SUMMARY

The present subject matter achieves the above goal by forming a product from a high-cobalt-content tungsten carbide grade, giving the product a higher fracture toughness than a corresponding low-cobalt-content tungsten carbide grade. After final finishing to size, known as green shaping, a boron nitride spray is applied to surfaces of the product where the potential for erosion is high and additional toughness is required, and the product is sintered at high temperature and the boron will diffuse into the regions where the spray was applied. The boron diffusion results in enhanced hardness and erosion resistance for these regions, while overall toughness remains very high. Additionally, the treatment induces some residual compressive stresses at the surface of the product that further enhances the erosion resistance and apparent toughness. This is different from a traditional boronizing or boriding treatment in that it happens in the liquid phase, not in solid state diffusion. In addition, the boron nitride treatment of the present subject matter is applied to a part in a green state rather than a sintered product.

In particular, a cemented tungsten carbide body is formed by mixing a tungsten carbide powder and a cobalt powder together to form a powder mixture. Preferably, the tungsten carbide powder makes up greater than or equal to 80 weight percent of the powder mixture, while the cobalt powder makes up about 1.5 to about 20 weight percent of the powder mixture. More preferably, the tungsten carbide powder makes up greater than or equal to 85 weight percent of the powder mixture, while the cobalt powder makes up about 5 weight percent to 15 weight percent of the powder mixture. Alternatively, other powdered binder phase components could be employed. For example, the powdered binder phase could include cobalt, nickel, iron, cobalt alloys, nickel alloys, iron alloys, cobalt-nickel, cobalt-iron, nickel-iron, cobalt-nickel-iron alloys or other binder phase materials or combinations of material with similar properties to cobalt powder. Next, the powder mixture is compacted to form a green compact, and slurry including, e.g., boron nitride and a liquid carrier is applied to a surface of the green compact to form a coated compact. The coated compact is sintered at a temperature sufficient to melt the cobalt powder, such that boron from the boron nitride coating diffuses into the compact and creates a gradient of metallic cobalt/binder and boron extending inward from the surface. The metallic cobalt binder content increases from the surface inward, while the boron content decreases from the surface inward and constitutes a gradient that extends into a working region that starts at the surface and extends inward. Preferably, the gradient extends at least 10 millimeters from the surface. More preferably the gradient extends at least 15 millimeters and most preferably, the gradient extends at least 20 millimeters from the surface.

Additional objects, features and advantages of the subject matter herein will become more readily apparent from the following detailed description of preferred embodiments thereof when taken in conjunction with the drawings wherein like reference numerals refer to common parts in the several views.

BRIEF DESCRIPTION OF THE DRAWINGS

The accompanying drawings, which are included to provide a further understanding of the subject matter and are incorporated in and constitute a part of this specification, illustrate implementations of the subject matter and together with the description serve to explain the principles of the disclosure.

DETAILED DESCRIPTION

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

The following definitions set forth the parameters of the described subject matter.

As used herein this disclosure, the terms "green compact" and "green body" mean that the object being described has not yet been sintered. Thus, they refer to a pressed material in the form of bonded powder or plates before the material has been sintered. The terms "green compact" and "green body" are used interchangeably, and as such, refer to the same subject matter.

As used herein this disclosure, the terms "about" and "approximately" are used interchangeably. It is meant to mean plus or minus 1% of the numerical value of the number with which it is being used. Thus, "about" and "approximately" are used to provide flexibility to a numerical range endpoint by providing that a given value may be "above" or "below" the given value. As such, for example a value of 50% is intended to encompass a range defined by 49.5%-50.5%.

As used herein this disclosure, "wt. %" refers to a given weight percent of the powder mixture, unless specifically indicated otherwise.

As used herein this disclosure, the term "predominantly" is meant to encompass at least 95% of a given entity.

As used herein, the term "substantially" refers to the complete or nearly complete extent or degree of an action, characteristic, property, state, structure, item, or result.

Wherever used throughout the disclosure, the term "generally" has the meaning of "approximately", "typically" or "closely" or "within the vicinity or range of".

Figure 1:
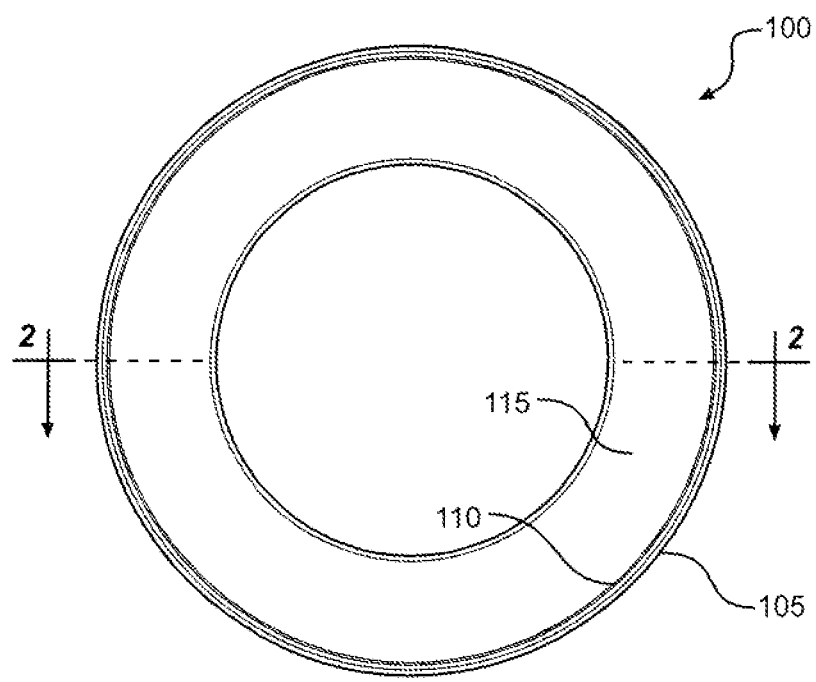
FIG. 1 is a top view of a cemented carbide valve seat produced in accordance with the present subject matter.
Figure 2:
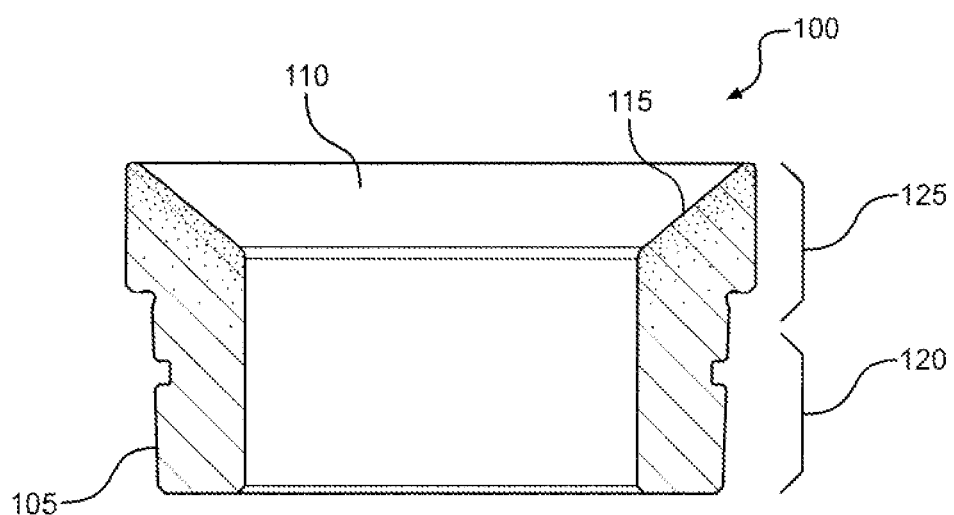
FIG. 2 is a cross-section of the valve seat.

With initial reference to FIGS. 1 and 2, there is shown a valve seat 100 produced in accordance with the present subject matter. Valve seat 100 includes a circular sidewall 105 defining an opening 110. In use, valve seat 100 is installed as part of a valve, with a disc of the valve (not shown) selectively sealing opening 110. Specifically, to close the valve, the disc is caused to contact an inner annular surface 115 of valve seat 100, preventing fluid from flowing through opening 110. To open the valve, the disc is moved out of contact with surface 115, such that fluid can flow through opening 110.

In certain applications, surface 115 is prone to erosion due to the combination of the regular contact with the disc and the nature of the fluid flowing over surface 115. Similarly, in certain applications, valve seat 100 is prone to fracturing due to the regular contact with the disc. The present subject matter addresses these potential issues by forming valve seat 100 from a high-cobalt-content tungsten carbide grade, giving valve seat 100 a high toughness. Also, as discussed in more detail below, a boron nitride treatment is applied to surfaces of valve seat 100 where the potential for erosion is high (e.g., surface 115), enhancing hardness and erosion resistance for these regions, while overall toughness remains very high. In addition, the treatment induces a residual compressive stress that further enhances the erosion resistance and apparent toughness. More specifically, valve seat 100 has a base region 120 and a working region 125. Working region 125 begins at surface 115 and includes a gradient of metallic cobalt and boron extending inward from surface 115. The gradient preferably extends at least 10 millimeters from surface 115. More preferably, the gradient extends at least 15 millimeters from surface 115 and, most preferably, the gradient extends at least 20 millimeters from surface 115. The metallic cobalt content increases from surface 115 inward, while the boron content decreases from surface 115 inward. This is presumably due to the boron of the boron nitride treatment reacting with the cobalt and tungsten in valve seat 100 to form a WCoB phase in working region 125 where the cobalt no longer acts as a binder but as a hard phase. That is, the cobalt in the WCoB phase is not metallic anymore. Also, while the boron of the boron nitride treatment diffuses into valve seat 100, the nitrogen does not. Alternatively, other powdered binder phase components could be employed.

Figure 3:
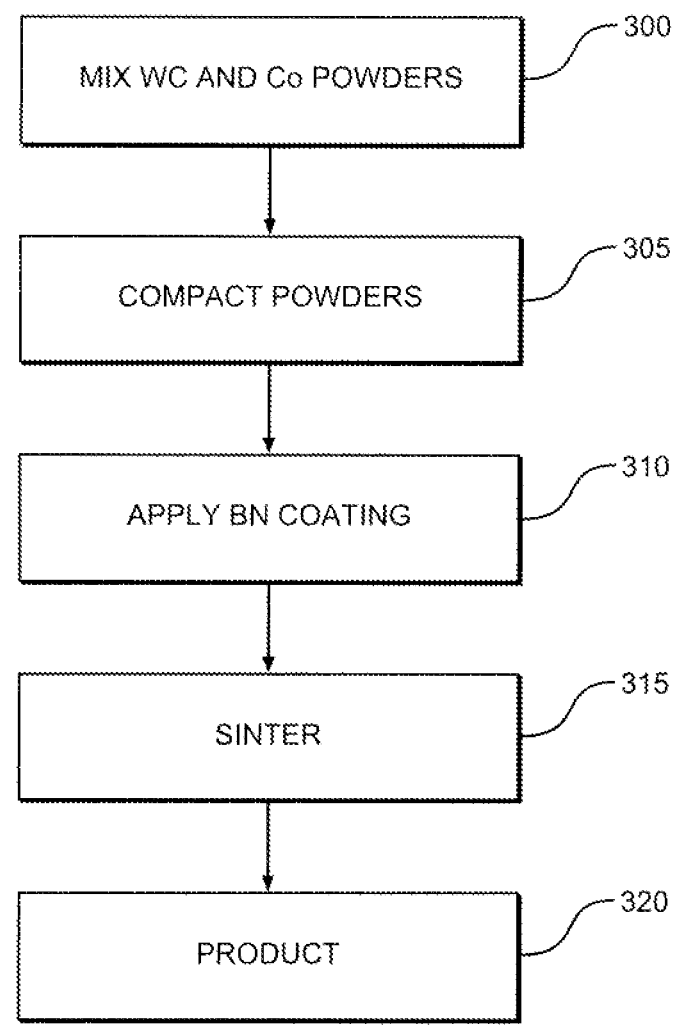
FIG. 3 is a flowchart of a process for producing the valve seat.

This process for producing valve seat 100 is illustrated in FIG. 3. In step 300, tungsten carbide and binder phase powders are mixed together. The relative amounts, types and particle sizes of these powders can vary depending on the desired properties, but, preferably, there is a relatively high amount of cobalt to give valve seat 100 a high toughness. For example, in some embodiments, the cobalt makes up about 1.5 to about 20 weight percent of the powder mixture, while the tungsten carbide makes up greater than or equal to 80 weight percent of the powder mixture. More preferably, the tungsten carbide powder makes up greater than or equal to 85 weight percent of the powder mixture, while the cobalt powder makes up about 5 to 15 weight percent of the powder mixture. Alternatively, other powdered binder phase components could be employed. For example, the powdered binder phase could include cobalt, nickel, iron, cobalt alloys, nickel alloys, cobalt-nickel alloys or other binder phase materials or combinations of materials with similar properties to cobalt.

In step 305, the powders are compacted into the desired shape for the resulting product, e.g., into the shape of valve seat 100. The cobalt acts as a binder for the tungsten carbide, holding the green compact together. Preferably the green compact includes some organic binder such as polyethylene glycol or wax to allow handling of the green part. This organic binder was then removed in the early stage of the sintering, in a debinding step (which is also called depeging or dewaxing). Additionally, machining in the green state may be required to achieve the desired green shape.

In step 310, a boron nitride coating is applied to the green compact, particularly to the portions of the compact where increased erosion resistance and hardness are desired, e.g., the portion that will become surface 115. The boron nitride coating is applied at room temperature and in liquid phase (specifically, as a boron nitride powder suspended in liquid carrier). The liquid carrier is preferably a liquid which will suspend the boron nitride powders during the application, and allow for the porosity of the green body to wick in the fine boron nitride powder. In other words, the powder is drawn into the interconnected pore network by a force, such as, e.g., capillary forces. The liquid carrier may be a liquid carrier which has a low vapor point, in that, the liquid carrier will evaporate quickly after application. After coating the predetermined portions, the liquid carrier is allowed to evaporate for several minutes up to several hours depending on the selection of the liquid carrier. Suitable liquid carriers according to the present subject matter include, but are not limited to, alcohol, acetone or other organic liquids. In some particular embodiments, the liquid carrier may include ethanol, methanol, isopropanol, butanol, or cyclohexanol as the alcohol, acetone or toluene as the organic liquid, an alcohol mixture, or an alcohol and an organic liquid mixture. Applying the coating in this fashion to the green compact allows for the coating to penetrate the compact more than would be achieved by coating a sintered part and leads to a part with gradual gradient in working region 125.

In step 315, the coated compact is sintered at a temperature sufficient to melt the cobalt, with the boron from the boron nitride coating further diffusing into the compact and reacting with the cobalt and tungsten to form a WCoB phase. The liquid diffusion creates a gradient where the metallic cobalt content is lower at the treated surface and higher deeper into the product while the boron content is higher at the treated surface and lower deeper into the product. In other words, at this point, there is no external boron nitride coating since the boron has been incorporated into the compact. This treatment provides the enhanced hardness and erosion resistance for the portions of the product where the boron nitride coating was applied (i.e., working region 125), while overall toughness remains very high. In addition, the gradient induces a residual compressive stress in the product that further enhances the erosion resistance and apparent toughness. Preferably, the sintering temperature is about 1,000° C. to about 1,700° C., more preferably about 1,200° C. to about 1,600° C. and most preferably about 1,300° C. to about 1,550° C. The sintering time is preferably from about 15 minutes to about 5 hours and more preferably from about 30 minutes to about 2 hours. Additional finishing steps may be employed to achieve the final part dimensions and tolerances, such as polishing seating surfaces 115.

In step 320, a final metal matrix composite body is produced in the form of valve seat 100.

The boron nitride treatment of the present subject matter is different from a traditional boronizing or boriding treatment, in that, it is applied in the presence of a liquid carrier to a green body, and upon sintering, the reaction and transport of the boron occurs through the liquid phase of the molten binder, not in solid state diffusion, and the hardness and erosion resistance of the working region are enhanced when compared to traditional boron treatments using solid state diffusion. As previously stated, the boron nitride treatment of the present subject matter is applied to a part in a green state, rather than a sintered product as in U.S. Pat. No. 8,602,131, which is incorporated herein by reference. This reduces the cost of the treatment by allowing for a single furnace run to react the boron phase while sintering the green body, creates a deeper gradient than a comparable gradient produced by applying a boron nitride treatment to a sintered product and changes the final microstructure (specifically, by providing a smaller WCoB phase, or other boron phase).

Although the above discussion focuses on a valve seat, it should be recognized that a variety of products can be produced in accordance with the present subject matter since a material having high toughness and high erosion resistance is both suitable for use and beneficial for use in many applications. The process described herein can be used to form a cemented tungsten carbide body, generally, where at least one surface of the body has been treated with boron nitride to create a gradient of metallic cobalt and boron extending inward from the surface. In this regard, in addition to a valve seat, any cemented carbide body can be produced according to the present subject matter. For example, cemented carbide bodies according to the present subject matter may include, e.g., tools or tool parts, wire drawing dies, mining buttons, metal cutting inserts, or the like. In this regard, any cemented carbide body that benefits from hardness and erosion resistance may be produced according to the present subject matter.

Although the present disclosure has been described in connection with embodiments thereof, it will be appreciated by those skilled in the art that additions, deletions, modifications, and substitutions not specifically described may be made without departure from the spirit and scope of the disclosure as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated", such that the desired functionality is achieved. Hence, any two components herein combined to achieve a particular functionality can be seen as "associated with" each other, such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges which can independently be included in the smaller ranges is also encompassed within the disclosure, subject to any specifically excluded limit in the stated range. Where the stated range includes one or both of the limits, ranges excluding either both of those included limits are also included in the disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Additionally, for example any sequence(s) and/or temporal order of sequence of the system and method that are described herein this disclosure are illustrative and should not be interpreted as being restrictive in nature. Accordingly, it should be understood that the process steps may be shown and described as being in a sequence or temporal order, but they are not necessarily limited to being carried out in any particular sequence or order. For example, the steps in such processes or methods generally may be carried out in various different sequences and orders, while still falling within the scope of the present disclosure.

Finally, the discussed application publications and/or patents herein are provided solely for their disclosure prior to the filing date of the described disclosure. Nothing herein should be construed as an admission that the described disclosure is not entitled to antedate such publication by virtue of prior disclosure.

What is claimed is:

1. A method of forming a cemented tungsten carbide body, comprising:
    mixing a tungsten carbide powder and a powdered binder phase together to form a powder mixture;
    compacting the powder mixture to form a green compact;
    applying a coating comprising boron nitride to a surface of the green compact to form a coated compact; and
    sintering the coated compact at a temperature sufficient to melt binder phase, such that boron from the boron nitride coating diffuses into the coated compact and forms a gradient of the boron extending inward from the surface at least 10 millimeters into a working region,
    wherein an amount of the boron decreases from the surface inward.

2. The method of claim 1, wherein the powdered binder phase comprises cobalt and sintering comprises forming a gradient of metallic cobalt and inducing a residual compressive stress in the cemented tungsten carbide body.

3. The method of claim 2, wherein sintering the coated compact comprises reacting the boron with tungsten and the cobalt to form a WCoB phase.

4. The method of claim 3, wherein the boron, the tungsten and the cobalt react in a liquid phase.

5. The method of claim 1, wherein the tungsten carbide powder makes up greater than or equal to 80 weight percent of the powder mixture and the powdered binder phase makes up 1.5 weight percent to 20 weight percent of the powder mixture.

6. The method of claim 1, wherein the powdered binder phase comprises at least one of cobalt, nickel, iron, cobalt alloys, nickel alloys, iron alloys, cobalt-nickel alloys, cobalt-iron alloys, nickel-iron alloys, cobalt-nickel-iron alloys.

7. The method of claim 1, wherein applying the boron nitride coating comprises spraying the boron nitride coating onto the green compact.

8. The method of claim 7, wherein applying the boron nitride coating comprises applying the boron nitride coating at room temperature.

9. The method of claim 1, wherein the temperature is 1000° C. to 1700° C.

10. A metal matrix composite body made by the method according to claim 1.

11. A metal matrix composite body, comprising:
a base region comprising tungsten carbide and cobalt; and
a working region beginning at a surface of the metal matrix composite body, the working region comprising a gradient of boron formed by applying a coating comprising boron nitride to a surface of a green compact prior to forming the metal matrix composite body, the gradient of the boron extending inward from the surface of the metal matrix composite body at least 10 millimeters into the working region,
wherein an amount of the boron decreases from the surface inward through the working region to the base region, and
wherein an amount of the cobalt increases from the surface inward.

12. The metal matrix composite body of claim 11, wherein the working region has a residual compressive stress.

13. The metal matrix composite body of claim 12, wherein the working region has an increased erosion resistance and hardness relative to the base region.

14. The metal matrix composite body of claim 11, wherein the metal matrix composite body is a valve seat.

15. The metal matrix composite body of claim 11, wherein the metal matrix composite body is part of a tool.

16. The metal matrix composite body of claim 11, wherein the tungsten carbide makes up greater than or equal to 80 weight percent of the base region and the cobalt makes up 1.5 weight percent to 20 weight percent of the base region.

17. The metal matrix composite body of claim 11, wherein the gradient extends at least 15 millimeters into the working region.

* * * * *